Oct. 8, 1935.  A. W. MILLER  2,016,338

PHOTOGRAPHIC FLASH LIGHT APPARATUS

Filed Jan. 12, 1934

Inventor

Arthur W. Miller

By Beaman & Langford

Attorney

Patented Oct. 8, 1935

2,016,338

UNITED STATES PATENT OFFICE 2,016,338

PHOTOGRAPHIC FLASH LIGHT APPARATUS

Arthur W. Miller, Jackson, Mich.

Application January 12, 1934, Serial No. 706,342

9 Claims. (Cl. 67—29)

This invention relates to photographic flashlight apparatus and more particularly to a device for synchronizing the action of the camera shutter and the light from the flash.

Devices for synchronizing the action of the camera shutter and the light from the flash are known but they are not wholly satisfactory for the reason that they can not be readily adjusted to secure the proper synchronization and their construction is complex, tending toward high cost and frequent repairs.

In the prior art attempts have been made to simplify synchronizing apparatus by balancing the tension of the shutter release and the flash igniting contact spring. Devices of this kind are unsatisfactory for the reason that the force required to release a camera shutter through a Bowden wire varies with each operation. An exact timing relation between the shutter release and the ignition of the flash is then impossible.

An object of this invention is to provide a device to synchronize the action of a camera shutter with the light from a flash.

Another object of this invention is to provide such a device being of simple construction and ready adjustability, the operation of which is independent of the tension exerted by the shutter release.

A further object of this invention is to provide a lever, the continuous motion of which releases the camera shutter and closes an electrical circuit.

Figure 1:
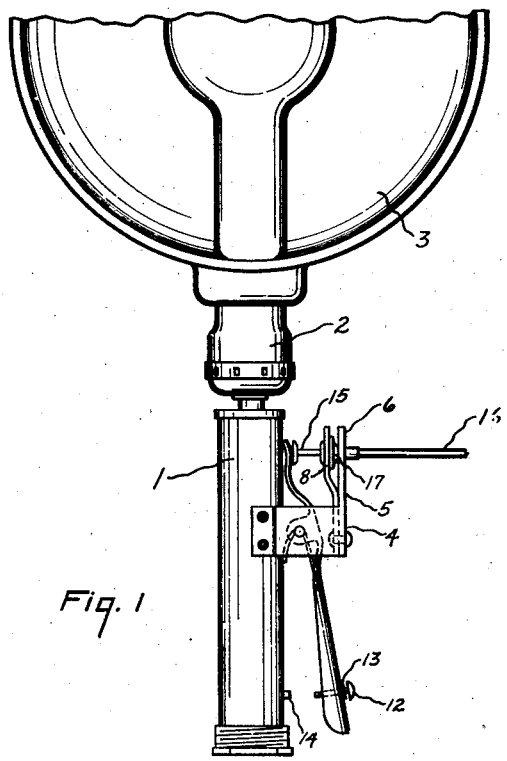
Figure 2:
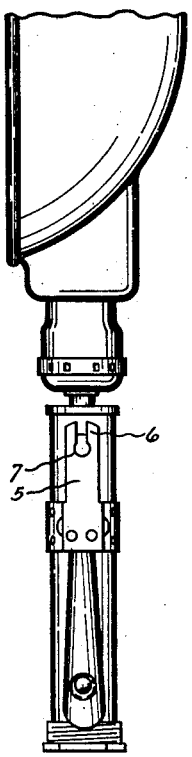
Figure 3:
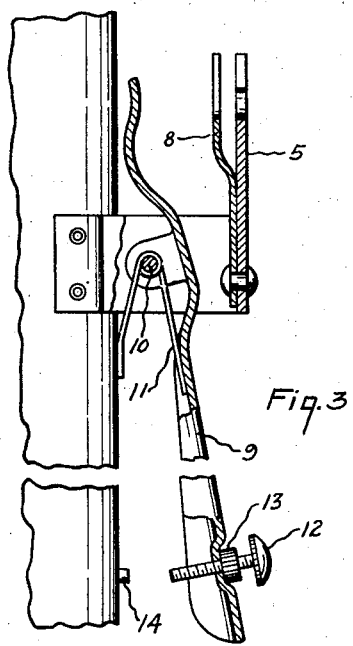

These and other objects will be apparent from the following specification when taken with the accompanying drawing in which Fig. 1 is a front elevation of a flashlight holder having thereon my improved synchronizing lever, Fig. 2 is a side elevation of Fig. 1, and, Fig. 3 is a broken away detail of the synchronizing lever.

Referring to the drawing 1 is the holder, housing a battery, and having mounted thereon the flash bulb socket 2 and the reflector 3. A U-shaped sheet metal bracket 4 is riveted or otherwise suitably fastened to each side of the holder 1. The bracket 4 has integrally formed therewith a vertical extension 5 provided with a bifurcated top portion 6 and a circular opening 7 at the base thereof. Riveted or otherwise suitably secured to the vertical extension 5 is a separate but similarly shaped spring metal strip 8. The spring strip 8 is likewise bifurcated at the top and provided with a circular hole in alignment with the hole in the extension 5. The bifurcations and opening 7 at the top of the extension 5 and the spring strip 8 may be made of sufficient size to accommodate any usual camera shutter release. The clamping action of the spring strip 8 will overcome any tendency for looseness when small size releases are used. A lever 9 preferably stamped from sheet metal is pivotally mounted between the arms of the U-shaped bracket 4 as at 10. A spring 11 holds the lever 9 away from the bottom of the holder 1. The bottom of the lever 9 is tapped and fitted with an adjustable circuit closing contact screw 12. A lock nut 13 is provided to hold the screw 12 in the position to which it is set. A contact 14 extends from the side of the holder 1 near the bottom and is insulated therefrom. The contact 14 is positioned in the path of the circuit closing contact screw 12. The holder may be wired in any suitable manner not shown to ground one terminal of the battery to the holder and to connect the other terminal with the contact 14.

The operation is as follows: The shutter release 15 is disposed in a cable 16 having a flange 17. The flange 17 is fitted in the space between the extension 5 and the spring strip 8 between their bifurcations. The spring strip 8 then holds the flange 17 and with it the cable 16 in fixed position. Pressure exerted by the hand on the lower half of the lever 9 causes the lever to pivot about its fulcrum and presses the shutter release 15 inwardly to release the camera shutter. The circuit closing screw 12 is adjusted so that at the moment of the opening of the shutter the contact button 12 closes the igniting circuit setting off the flash.

A simple method of adjusting the synchronizer is to place between the contacts 12 and 14 a piece of thin paper such as newspaper. Adjustable contact 12 is then moved inwardly or outwardly until the camera shutter is released at the moment the contacts 2 touches the paper on the contact 14. With this adjustment, a slight delay between the shutter opening and the flash igniting is obtained in order to secure full shutter opening. As a result, the flash lamp is ignited after a minimum lapse of time from the moment the shutter is fully opened.

While a single modification of the invention has been disclosed it is within the contemplation of this invention for instance that a different arrangement of the parts be used or that a different style of lever be provided. The bracket 4 may be clamped to the holder or both the shutter releasing means and the circuit closing means may be located on the same side of the lever fulcrum. It is not intended, therefore, that I be limited except by the scope of the following claims.

I claim:

1. In a photographic flashlight apparatus the combination of a flashlight holder, a bracket mounted thereon, a lever supported by said bracket, means connected to the shutter of a camera for engagement by said lever to open said shutter, and means operated by said lever to set off a flash.

2. In a photographic flashlight apparatus, the combination of a flashlight holder, a bracket mounted thereon, a lever supported by said bracket having a portion adapted to engage camera shutter releasing means and means on said lever to close an electrical igniting circuit.

3. In a photographic flashlight apparatus, the combination of a flashlight holder, a lever mounted thereon, means associated with said lever to hold camera shutter releasing means, an electrical contact supported by said holder and means on said lever adapted to be moved into engagement with the contact on said holder.

4. In photographic flashlight apparatus, the combination of a flashlight holder, a bracket, having two legs mounted thereon a lever pivotally supported between said two legs, means extending from said bracket to support a camera shutter releasing means, and disposed adjacent one end of said lever, and an electrical circuit closing means on said lever.

5. In a photographic flashlight apparatus, the combination of a flashlight holder, a bracket associated therewith, a lever pivotally mounted on said bracket, means extending from said bracket to support a camera shutter releasing means and disposed adjacent to one end of said lever, an electrical flash igniting circuit associated with said holder and means on said lever adapted, upon movement thereof to close said circuit.

6. In a photographic flashlight apparatus, the combination of a flashlight holder, a bracket fixed to said holder, a lever pivotally mounted on said bracket, means on said bracket to support a camera shutter releasing means and disposed adjacent to said lever, an electrical circuit associated with said holder, means on said lever adapted on movement thereof to close said circuit and means to maintain said lever normally in inoperative position.

7. In a photographic flashlight apparatus, the combination of a flashlight holder, a lever mounted thereon, means associated with said lever to support a camera shutter releasing means, a flash igniting circuit, a contact comprising a part of said circuit, and means on said lever adapted to be moved into engagement with said contact to close said circuit.

8. A photographic accessory for synchronizing the opening of a camera shutter with the setting off of a flash comprising a base, a bracket secured on said base, a lever pivoted between its ends in said bracket, said lever being adapted to be manually engaged by the hand of the operator, means extending from said bracket to support a camera shutter releasing means and disposed adjacent one end of said lever, and an electrical circuit closing means on said lever.

9. A photographic accessory for synchronizing the opening of a camera shutter with the setting off of a flash comprising a base, a bracket secured on said base, a lever pivoted between its ends in said bracket, said lever being adapted to be manually engaged by the hand of the operator, means extending from said bracket to support a camera shutter releasing means and disposed adjacent one end of said lever, an electrical circuit closing means on said lever, and means on said lever to adjust the synchronization.

ARTHUR W. MILLER.